United States Patent [19]

Clark

[11] Patent Number: 4,482,221

[45] Date of Patent: Nov. 13, 1984

[54] MICROSCOPE FINE FOCUS CONTROL MECHANISM

[75] Inventor: James A. Clark, Honeoye Falls, N.Y.

[73] Assignee: Bausch & Lomb Incorporated, Rochester, N.Y.

[21] Appl. No.: 385,734

[22] Filed: Jun. 7, 1982

[51] Int. Cl.³ ............................................. G02B 21/26
[52] U.S. Cl. .................................... 350/530; 350/531; 74/665 B
[58] Field of Search ............... 350/518, 521, 529, 530, 350/531; 74/665 B, 479

[56] References Cited

U.S. PATENT DOCUMENTS

| | | | |
|---|---|---|---|
| 3,683,704 | 8/1972 | Kuroha | 350/530 |
| 4,020,705 | 5/1977 | Hayasaka | 74/665 B |
| 4,083,256 | 4/1978 | Shio | 350/530 |
| 4,299,440 | 11/1981 | Hodgson | 350/530 |

*Primary Examiner*—John K. Corbin
*Assistant Examiner*—Lynn Vandenburgh Kent
*Attorney, Agent, or Firm*—John S. Norton; DeWitt M. Morgan

[57] ABSTRACT

A monoaxial adjusting system is provided for accomplishing both coarse and fine focusing adjustments between the nosepiece and stage of a microscope. The coarse adjustment is made by rotation of either of two coarse adjusting knobs which in turn directly rotates a coarse adjusting shaft and cam. Suitable linkage is connected to the cam to affect linear movement between the nosepiece and stage. Fine adjustment is made through rotation of either of two fine adjusting knobs which actuate the coarse shaft and cam through a planetary gear reduction system and follower. A further adjusting mechanism is lever operated so that the operator may easily provide fine adjustment while manipulating the North-South stage and East-West slide control knobs. The entire adjusting system is spring and gravity loaded to eliminate backlash.

7 Claims, 4 Drawing Figures

MICROSCOPE FINE FOCUS CONTROL MECHANISM

CROSS REFERENCE TO RELATED APPLICATIONS

This application is cross-referenced to concurrently filed application Ser. No. 385,424, filed June 7, 1982 entitled "Mechanism for Accomplishing Coarse and Fine Adjustments in a Microscope" for Inventor Henry J. Emmel, now patent no. 4,445,758.

BACKGROUND OF THE INVENTION

This invention relates in general to mechanical movements for providing focusing adjustment to microscopes and, more particularly, to a monoaxial coarse and fine adjusting mechanism which enables the operator to accomplish coarse and fine focusing when viewing and scanning slides.

DESCRIPTION OF THE PRIOR ART

In the past various methods have been used for providing coarse and fine adjustments in microscopes. Some are accomplished by moving the stage relative to the nosepiece while others move the nosepiece, relative to the stage. Examples of microscopes having coarse and fine adjusting mechanisms for providing adjustment to the nosepiece are illustrated and described in U.S. Pat. Nos. 3,135,817 issued June 2, 1964 to N. A Rigglesworth et al and 3,260,157 issued July 12, 1966 to O. W. Boughton. An example of a microscope having a stage adjusting mechanism may be found in U.S. Pat. No. 4,083,256 issued Apr. 11, 1976 to M. Shio.

The microscope adjusting mechanism shown by Rigglesworth is a compound cam and associated linkage wherein the cam would be rotated to accomplish coarse adjustment of the nosepiece. The cam would then be axially translated for fine adjustment. The patent to Boughton similarly discloses a cam which is rotated for coarse adjustment and axially translated to accomplish fine adjustment.

A further example of another type of microscope focusing mechanism is disclosed in U.S. Pat. No. 3,768,885 issued Oct. 30, 1973 to O. W. Boughton et al. The coarse-fine focusing mechanism for this microscope discloses a movable nosepiece which is connected to a linkage that is in direct engagement with a rotatable cam. The cam is rotated by a reduction gear system for fine adjustment. Both the cam and gear system are rotated together in order to accomplish coarse adjustment. The reduction gear system is comprised of a plurality of gears and pinions enclosed in a gear box. Costly precision parts are required for preventing backlash in this adjusting system.

Further examples of various other microscope adjusting systems may be found in U.S. Pat. Nos. 3,683,704, 4,020,705 and 4,173,902.

The systems coarse-fine adjusting described in the patents cited above are generally rather complicated and, accordingly, expensive to manufacture.

SUMMARY OF THE INVENTION

This invention is directed toward a mechanism for providing fine focus adjustments to microscopes Basically, a hub with an eccentric bushing is fitted between the coarse-fine shafts and the support column of the microscope in such a manner that if the hub and eccentric bushing is rotated, the coarse-fine shaft will be displaced vertically a limited amount such that fine focusing of the nosepiece can be accomplished. An actuating lever may be affixed to the hub to enable the microscope user to easily grasp the lever between his fingers while simultaneously manipulating the stage (N-S) and slide (E-W) adjust knobs.

DETAILED DESCRIPTION OF THE PREFERRED EMBODIMENT

Figure 1:
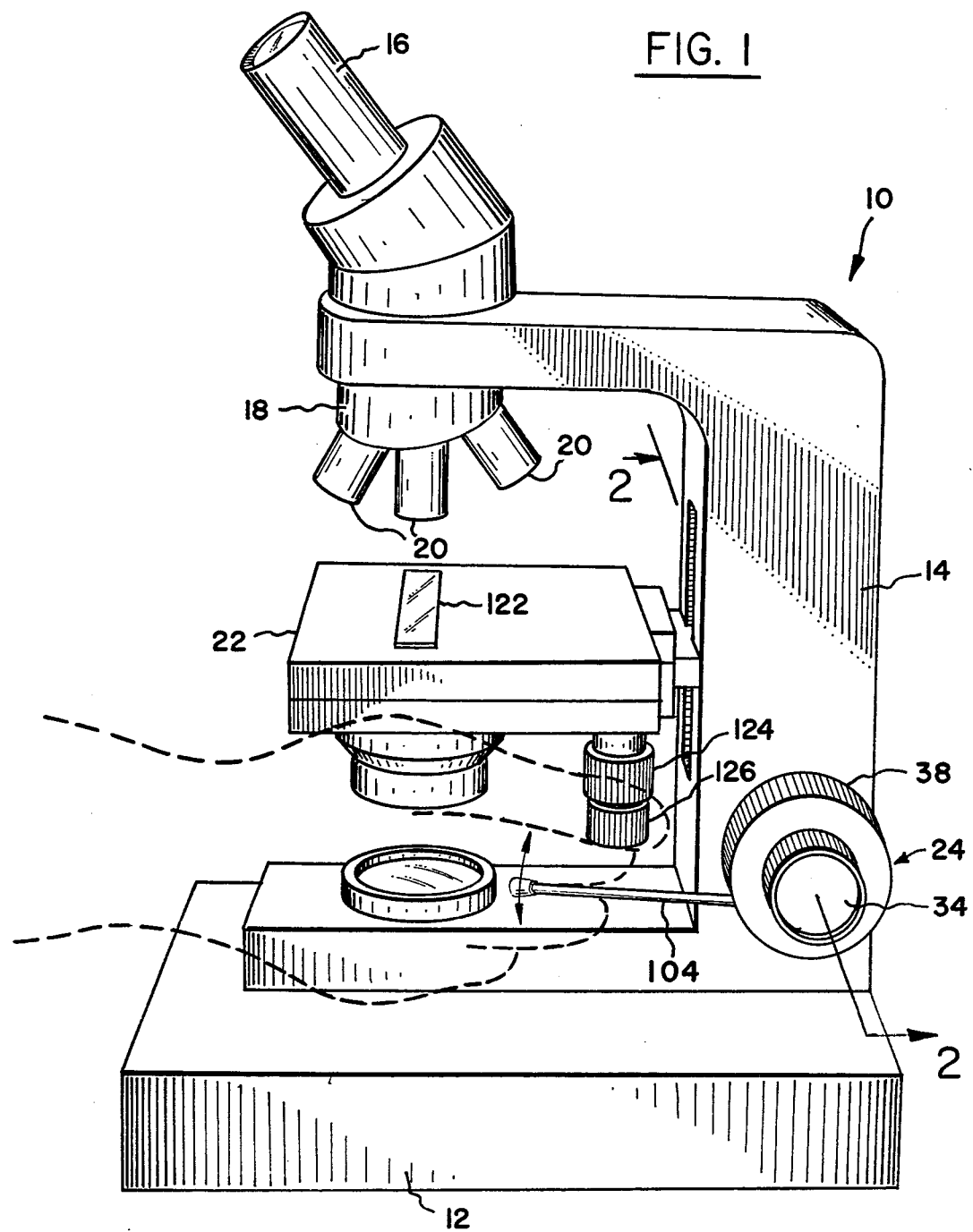
FIG. 1 is a perspective view of a microscope having a coarse-fine focus control mechanism.

Referring to FIG. 1, a microscope 10 comprises a base 12, a support column 14, and eyepiece 16, a nosepiece 18, a plurality of objectives 20 and a stage 22. A coarse-fine adjusting mechanism 24 is supported by the column 14 and may be mechanically coupled to either the nosepiece 18 or the stage 22 by any appropriate mechanism such that rotation of the mechanism 24 provides relative adjustment between the nosepiece 18 and the stage 22.

Figure 2:
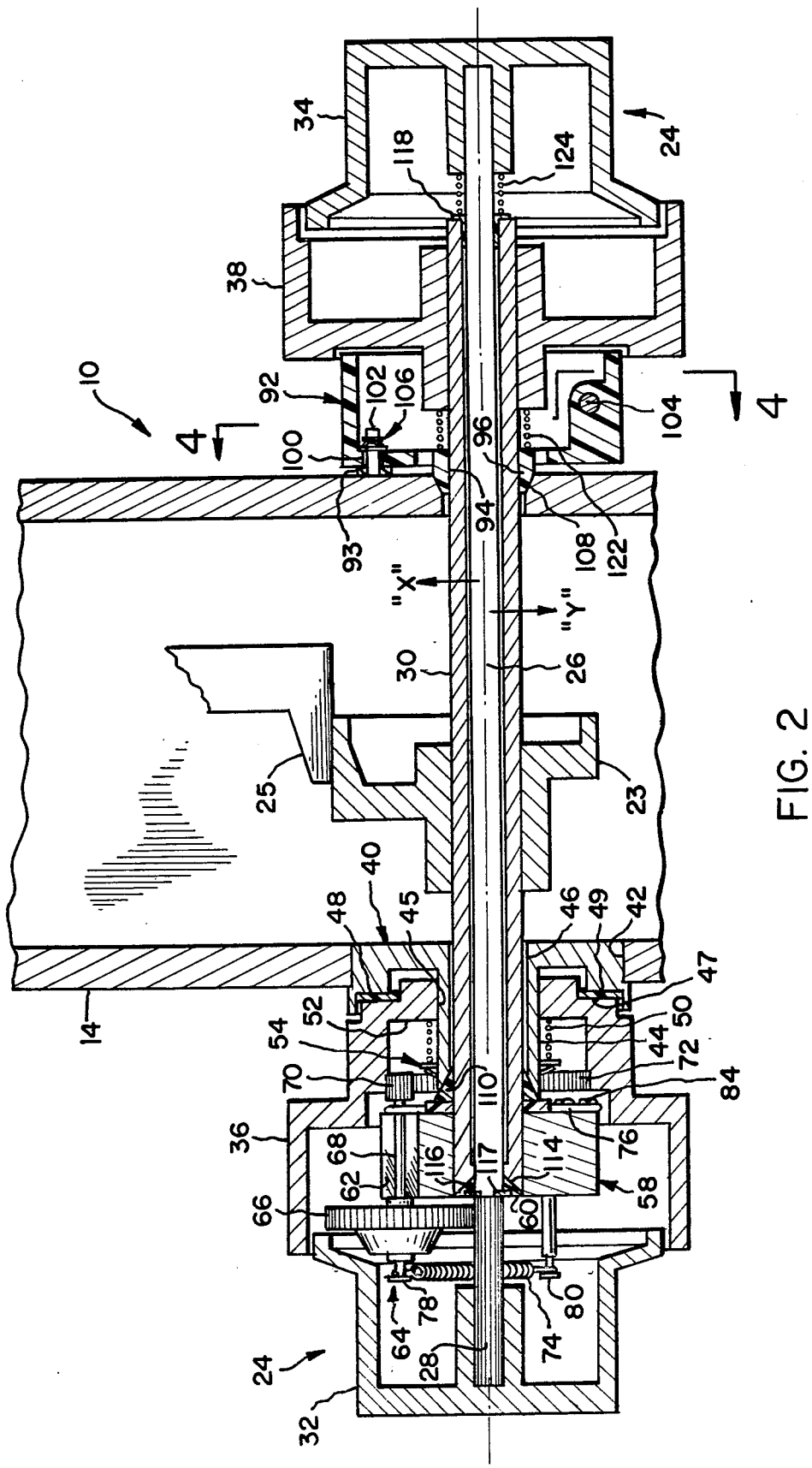
FIG. 2 is a partial plan view in section taken along line 2—2 of FIG. 1.

FIG. 2 illustrates the relationship between the microscope support column 14 and the coarse-fine adjusting mechanism 24. The mechanism 24 comprises a fine shaft 26 which has a pinion 28 formed at one end thereof. A coarse shaft 30 is coaxially mounted about fine shaft 26 and is provided for imparting gross adjustment to the instrument. A cam 23 and appropriate linkage 25 are coupled to the adjusting mechanism 24 so that rotation of the mechanism and cam provides linear movement to the linkage which in turn provides relative adjustment between the stage and the eyepiece.

The fine adjusting shaft 26 has adjusting knobs 32 and 34 fixed at opposite ends in any appropriate manner so that rotation thereof also causes the shaft 26 to rotate. A second set of knobs 36 and 38 is connected to coarse adjusting shaft 30. Knob 38 is positively affixed for direct rotation of the shaft 30, while knob 36 is mounted in a manner to be more fully explained later in this description.

A bearing support collar 40 is fixed within bore 42 of support column 14. Collar 40 has a boss 44 with a bore 46 which is sized so that it may be slipped over shaft 30. Knob 36 has a bore 45 which is sized to receive boss 44 of bearing collar 40 so that friction surface 47 of knob 36 may be placed in close proximity to a corresponding friction surface 49 of collar 40. A clutch washer 48 is positioned between the friction surfaces 47 and 49. A coil spring 50 is positioned about bearing boss 44. One end bears against surface 52 of knob 36 while the other end is held by a washer/retainer assembly 54 which is secured to boss 44. The spring 50 thereby exerts pressure between the washer/retainer assembly 54 and the knob 36 which frictionally engages the clutch washer 48 between the friction surfaces 47 and 49. The knob 36 therefore is frictionally engaged to the bearing collar 40, which is held firmly in place in support column 14, and may not rotate unless a rotational force is applied either directly to it or to the other coarse knob 38. The coarse knobs will not rotate when the fine knobs are being rotated.

Figure 3:
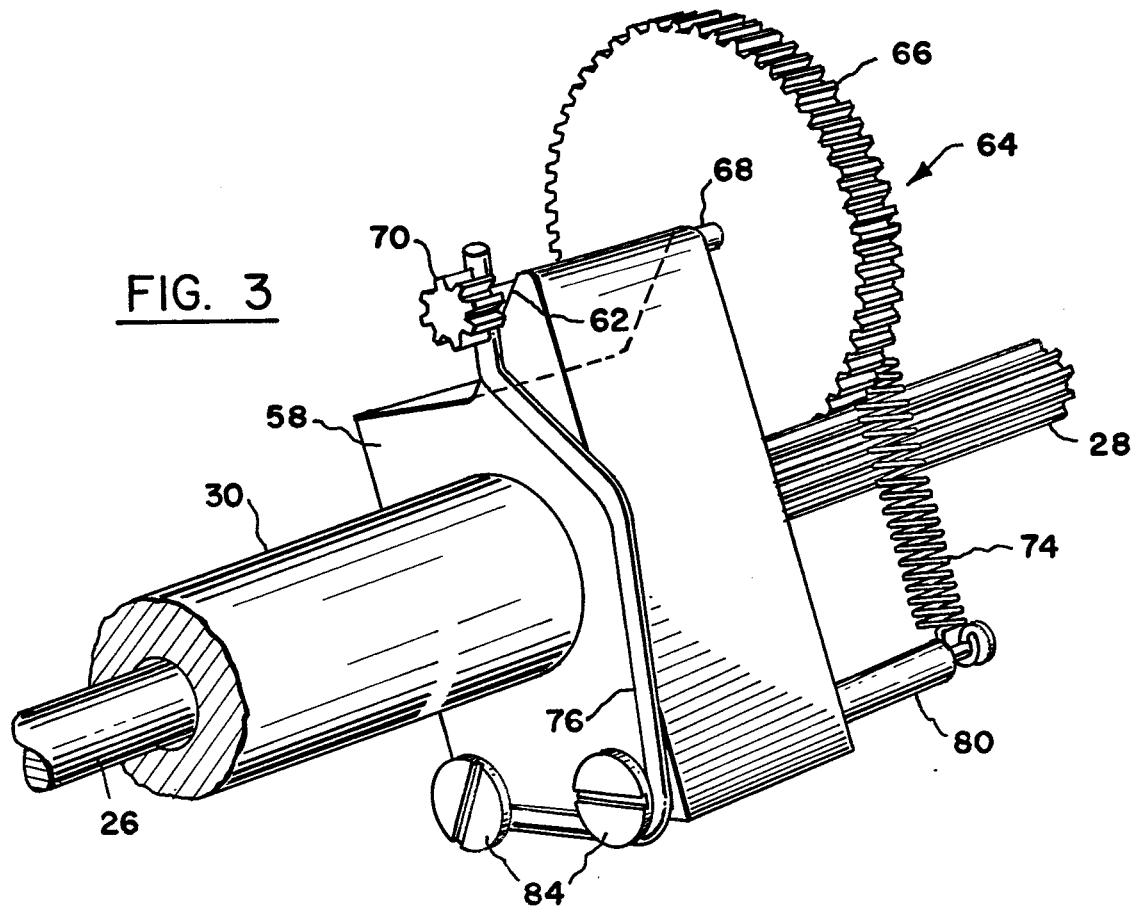
FIG. 3 is a perspective view of the gear follower and biasing mechanism.

A gear follower member 58 is securely attached near the end 60 of the coarse shaft 30 and has a ramped surface 62, as best seen in FIG. 3, which will be more fully explained hereinafter.

A cluster gear and pinion assembly 64 comprises a cluster gear 66, a shaft 68 and a cluster pinion 70. Assembly 64 is positioned so that the shaft 68 is positioned across and bears against the ramped surface 62 of follower member 58 as illustrated in FIGS. 2 and 3. Cluster gear 66 engages pinion 28 while cluster pinion 70 engages coarse knob ring gear 72 provided on an internal surface of knob 36. In order to hold the shaft 68 against the ramp surface 62, the cluster gear 66 in engagement with the pinion gear 28 and the cluster pinion against ring gear 72, a pair of biasing springs 74 and 76 provided. One of the springs, coil spring 74, extends from a cluster gear shaft extension 78 to retaining post 80 on gear follower member 58. The other spring, cantilever spring 76, is secured to follower member 58 by, for instance, screws 84 so that it bears against the shaft 68 near the pinion gear 70. In this manner the springs exert pressure against the shaft 68 so that the shaft essentially self-centers itself on the ramped surface 62 of gear follower member 58 and so that pinion gear 70 is properly received by, and preloaded into, ring gear 72. The cluster gear shaft 68 may move substantially radially on the ramped surface 62 to find proper alignment. Thus, the critical dimensioning necessary in nearly all microscopes featuring planetary gear systmems has effectively been eliminated. Cluster gear 66 is similarly held in position and loaded against pinion 28 by spring 74.

Figure 4:
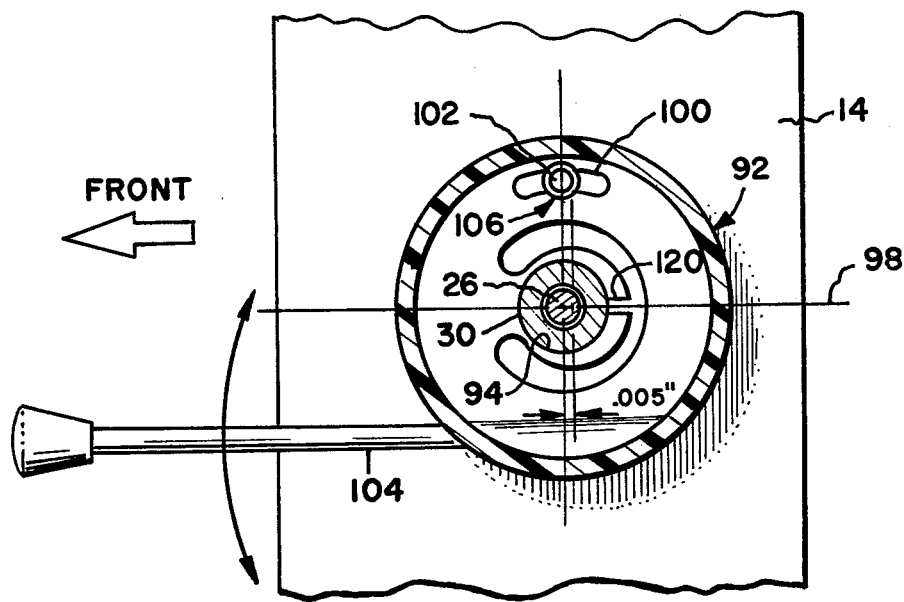
FIG. 4 is a sectional view taken along line 4—4 of FIG. 2.

A hub 92 is fitted to shaft 30 and is positioned between coarse knob 38 and support column 14. As illustrated in FIGS. 2 and 4, hub 92 has a bore 94 which is journaled about coarse shaft 30. Further, as explained more fully hereinafter, it has a tapered bushing 96 which is eccentric approximately 0.005" to bore 94 along axis 98 as best seen in FIG. 4. A slot 100 is formed in the hub 92 concentric to bore 94 and extends over an arc of approximately 40°. A stop member 102 is positioned on the support column 14 so that it is received in slot 100. A lever 104 is affixed to the hub 92 and extends in a direction generally toward the front of the microscope. Stop member 102 has a spring and washer assembly 106 mounted thereto which presses hub 92 against a friction washer 93 which is positioned between the column 14 and hub 92. This arrangement acts to resist rotation of the hub 92 when the coarse shaft 30 is rotated. However, this clutch effect may be overcome by the operator merely rotating the lever 104.

As is evident from FIG. 2, the tapered bushing 96 of hub 92 forms one of the conical bearings provided to support the coarse shaft 30 with respect to the support column 14. It is received in an accommodating conical bore 108 of support column 14. A second conical bearing 110 is fitted to accommodating conical bore 112 of bearing support collar boss 44.

An additional conical bearing 114 is fitted to bore 116 to support one end of fine shaft 26. A thrust washer 117 is fitted to the shaft 26 and holds the bearing 114 in place. The conical bearing 114 eliminates radial movement between fine shaft pinion 28 and coarse shaft 30. The opposite end of the fine shaft 26 has no critical rotational relationship to any adjustments that may be made and, may therefore, have a much simpler spacer bearing 118 which may be fitted between fine shaft 26 and coarse shaft 30. It has been found that the conical bearings, as well as the spacer bearing work extremely well if they are manufactured from a material such as acetal.

In order to provide a system for supporting the coarse-fine shafts that essentially self adjusts allowing for both loose tolerances and wear, tapered bushing 96 and conical bearings 110 and 114 are split, such as is shown by 120 in FIG. 3. A coil spring 122 is fitted about coarse shaft 30 and exerts pressure between tapered bushing 96 and coarse knob 38 which is firmly attached to shaft 30. Another coil spring 124 is fitted about fine shaft 36 and exerts pressure between spacer bearing 118 and knob 34. It will be appreciated that these springs exert pressure essentially axially and therefore, spring load the bearings into their accommodating bores. The bearings may either expand or collapse about the shafts until a proper fit between the bearing and shaft is achieved. If either of the shafts vary in diameter, the split bearings are able to automatically accommodate for variations in shaft diameter and for radial wear.

In operation a slide 122 is positioned on the stage 22 and one of the coarse adjusting knobs 36 or 38 is rotated to brong the slide into approximate focus. It will be appreciated that in order to rotate either of the coarse knobs, the frictional engagement that exists between knob 36 and clutch washer 48 must be overcome.

When knob 38 is rotated, it directly rotates the coarse shaft 30. Knob 36, however, is not directly mounted to the shaft 30. Instead, it rotates the shaft through the cluster gear and pinion assembly 64 and the gear follower 58. That is, when the knob 36 is directly rotated by the operator, it drives the cluster gear and pinion assembly 64, because the cluster pinion 70 is in mesh with the knob ring gear 72. The gear follower 58 is driven by the cluster gear shaft 68 and, consequently, rotates the coarse shaft 30 to which it is directly mounted.

When the coarse adjustment has been accomplished the operator would then rotate either of the fine adjusting knobs, 32 or 34, which causes rotation of the fine shaft pinion 28. The cluster gear and pinion assembly 64 which is in engagement with the pinion 28 would then also rotate. However, the frictional engagement between coarse knob 36 and clutch washer 48, explained hereinabove, is sufficient to prevent rotation of the coarse knob 36 by pinion gear 70. Thus, gear 70 acts as a planet gear rotating in mesh with ring 72. The gear follower member 58 is controlled by the cluster gear shaft 68. Therefore, when the shaft 68 rotates with gear 70 it also rotates the gear follower 58. However, the amount of rotation is only proportional. That is, where one revolution of either of the coarse knobs rotates the coarse shaft one revolution, one revolution of either of the fine knobs only causes the cluster gear and pinion assembly, which drives the gear follower 58, to rotate the coarse shaft approximately 1/60th of a turn.

This system prevents backlash from occurring in the adjusting system through the use of the cluster gear and pinion assembly, gear follower and spring biasing arrangement. Backlash is also prevented as the linkage 25 which rests on the cam 23 provides a gravity method of loading the adjusting system.

In the past when adjusting the (N-S) knob 124 and the (E-W) knob 126 so that a slide 122 could be scanned, it was necessary to position the hand in a very awkward manner so that the desired knob could be rotated with a thumb and forefinger, while simultaneously, and continually, rotating the fine focus knob 34 with one of the remaining fingers. To overcome this difficulty, the hub 92 has been provided with the aforementioned lever 104 which the operator can easily position between the third, fourth or fifth fingers, as best seen in FIG. 1. In this fashion the operator would still have use of the thumb and forefinger for rotating knobs 124 and 126 while scanning the slide. The operator may now easily move the lever 104, either in an upward or downward arc of approximately 40°. This lever movement causes the hub 92 to rotate. Because tapered bushing 96 is 0.005" eccentric, as previously described, movement of the lever 104, for instance, through the full 40° causes the shaft 30 to vertically raise or lower (as indicated by "X" and "Y") in FIG. 2 approximately 0.002". This vertical movement of the shaft 30 translates into a vertical adjustment of ±0.001" at the objective as the cam is positioned approximately midway on the shaft. It should be understood that the orientation of the bushing 96 with respect to the column 14 has been selected such that a maximum vertical component is imparted to the shaft 30 when the hub 92 is rotated. This vertical movement, even though slight, is more than sufficient to allow for the continual fine adjustment needed to the maintained while scanning slides.

Therefore, in effect, the rotation of the hub 92 by the operator causes the coarse shaft 30 to pivot about the split conical bearing 110 which causes the cam to raise or lower. Obviously, the position of the hub 92 has been selected so that when the lever 104 is rotated in an upward manner, the cam also moves upward. Similarly, downward rotation of the lever moves the cam downward.

From the foregoing, it will also be appreciated that the eccentric bushing arrangement could be fitted to a microscope which has a single adjusting shaft. This single shaft would be rotated directly, as in a normal microscope, to provide the coarse adjustment. The eccentric bushing, which would be fitted between the column and shaft, would be rotated to provide fine adjustment. There would be no need for the associated, and sometimes complicated, normal gear reducing systems for providing fine adjustments. Sufficient movement can be provided by use of the eccentric bushing alone.

The foregoing description is given by way of example only and should not be considered a limitation. It is contemplated that changes and modifications may be made in the present invention without departing from the spirit or scope thereof.

What is claimed is:

1. In an optical instrument having a support and an adjusting system supported thereby, said system having at least one shaft and mechanism cooperatively engaged thereto for providing relative movement between the instrument's optics and an object being examined, a fine focusing control mechanism comprising:

a rotatable member eccentrically positioned between said at least one shaft and said support for accomplishing fine focusing whereby rotation of said rotatable member displaces said at least one shaft with respect to said support a sufficient amount such that said mechanism imparts fine focusing movement.

2. The optical instrument fine focusing control mechanism as set forth in claim 1, wherein said rotatable member comprises an eccentric bushing and includes projection means on said bushing to enable the operator to readily grasp said projection means to rotate said eccentric bushing.

3. The optical instrument fine focusing control mechanism as set forth in claim 2, wherein said projection means comprises an actuating lever.

4. The optical instrument fine focusing control mechanism as set forth in claim 1, wherein stop means is provided for cooperative engagement between said support and said rotatable member whereby said stop means prevents said rotatable member from rotating past a preselected point.

5. The optical instrument fine focusing control mechanism as set forth in claim 4 wherein said stop means comprises a pin projecting from said support column and being received within a slot formed in said rotatable member.

6. The optical instrument fine focusing mechanism as set forth in claim 5, and futher including friction means for cooperative engagement between said column and said rotatable member whereby rotation of said rotatable member is prevented when said at least one shaft is rotated by knobs affixed thereto yet being rotatable when force is applied directly thereto.

7. The optical instrument fine focusing system as set forth in claim 6, wherein said friction means is affixed to said projecting pin.

* * * * *

UNITED STATES PATENT AND TRADEMARK OFFICE
CERTIFICATE OF CORRECTION

PATENT NO. : 4,482,221
DATED : November 13, 1984
INVENTOR(S) : James A. Clark

It is certified that error appears in the above-identified patent and that said Letters Patent is hereby corrected as shown below:

The title page should be deleted to appear as per attached title page.

Column 1, line 58, after "adjusting" insert -- systems --.
Column 1, line 66, before "shafts" insert -- adjusting --.
Column 3, line 17, insert -- are -- before "provided".
Column 3, line 67, "simplier" should read -- simpler --.
Column 4, line 24, "brong" should read -- bring --.

Signed and Sealed this

Twenty-first Day of May 1985

[SEAL]

Attest:

DONALD J. QUIGG

Attesting Officer     Acting Commissioner of Patents and Trademarks